(12) United States Patent
Crosson

(10) Patent No.: US 11,708,837 B2
(45) Date of Patent: Jul. 25, 2023

(54) FAN AND ELECTRIC MACHINE ASSEMBLY AND METHODS THEREFOR

(71) Applicant: Regal Beloit America, Inc., Beloit, WI (US)

(72) Inventor: Jeffrey William Crosson, Dayton, OH (US)

(73) Assignee: Regal Beloit America, Inc., Beloit, WI (US)

(*) Notice: Subject to any disclaimer, the term of this patent is extended or adjusted under 35 U.S.C. 154(b) by 156 days.

(21) Appl. No.: 17/158,814

(22) Filed: Jan. 26, 2021

(65) Prior Publication Data
US 2022/0235795 A1    Jul. 28, 2022

(51) Int. Cl.
| | |
|---|---|
| F04D 25/08 | (2006.01) |
| F04D 29/52 | (2006.01) |
| F04D 29/58 | (2006.01) |
| H02K 5/20 | (2006.01) |
| F04D 29/28 | (2006.01) |
| H02K 9/06 | (2006.01) |

(52) U.S. Cl.
CPC ......... *F04D 25/082* (2013.01); *F04D 29/281* (2013.01); *F04D 29/522* (2013.01); *F04D 29/584* (2013.01); *H02K 5/207* (2021.01); *H02K 9/06* (2013.01)

(58) Field of Classification Search
CPC .. H02K 9/04; H02K 9/06; H02K 9/14; H02K 5/207; H02K 1/03; H02K 1/32; F04D 25/082; F04D 29/281; F04D 29/282; F04D 29/4213; F04D 29/522; F04D 29/5813; F04D 29/584; F04D 29/703

USPC ............................. 416/182, 183, 184, 185
See application file for complete search history.

(56) References Cited

U.S. PATENT DOCUMENTS

| | | | |
|---|---|---|---|
| 1,996,460 A | 4/1935 | Coates | |
| 3,223,867 A | 12/1965 | Shapiro | |
| 4,427,339 A * | 1/1984 | Witzel | F04D 29/283 |
| | | | 416/135 |
| 4,747,221 A | 5/1988 | Hayes | |
| 4,794,285 A | 12/1988 | Nimura et al. | |
| 5,125,236 A | 6/1992 | Clancey et al. | |
| 5,929,547 A | 7/1999 | Kim | |
| 6,091,169 A | 7/2000 | Umeda et al. | |

(Continued)

FOREIGN PATENT DOCUMENTS

| | | |
|---|---|---|
| CN | 105990934 A | 10/2016 |
| EP | 3144542 A1 | 3/2017 |

*Primary Examiner* — Kenneth J Hansen
(74) *Attorney, Agent, or Firm* — Armstrong Teasdale LLP

(57) ABSTRACT

A motor assembly having a rotational axis includes a motor housing comprising a plurality of cooling openings extending therethrough and defining a chamber. The motor assembly also includes a stator fixedly coupled to the motor housing and positioned within the chamber. A rotor is coupled to at least one of the motor housing and the stator, wherein the rotor is configured to rotate about the axis and is positioned within the chamber. The motor assembly includes a fan having a first inlet side on a first axial side of the fan and a second inlet side on a second, opposing, axial side of the fan. The fan is configured to draw cooling air in a first direction through the at least one cooling opening into the first inlet side, and the fan is also configured to draw cooling air in a second, opposite direction into the second inlet side.

20 Claims, 7 Drawing Sheets

(56) References Cited

U.S. PATENT DOCUMENTS

| | | | |
|---|---|---|---|
| 2002/0094275 A1* | 7/2002 | Bostwick | H02K 9/06 |
| | | | 416/185 |
| 2008/0030086 A1 | 2/2008 | Noda et al. | |
| 2008/0150400 A1 | 6/2008 | Crowell | |
| 2009/0136357 A1* | 5/2009 | Vadillo | F04D 29/281 |
| | | | 416/244 R |
| 2012/0001503 A1 | 1/2012 | Owng et al. | |
| 2012/0027597 A1* | 2/2012 | Kang | F04D 29/666 |
| | | | 416/183 |
| 2013/0119795 A1* | 5/2013 | Haga | H02K 9/227 |
| | | | 310/59 |
| 2014/0070600 A1 | 3/2014 | Park | |
| 2016/0056682 A1 | 2/2016 | Cocks et al. | |
| 2016/0097394 A1 | 4/2016 | Golm, Jr. et al. | |

* cited by examiner

FAN AND ELECTRIC MACHINE ASSEMBLY AND METHODS THEREFOR

BACKGROUND

The field of the invention relates generally to fans and, more particularly, to cooling fans for motor assemblies.

Many known electric machines such as electric motors generate heat during operation. At least some known motors are provided with a cooling fan rotatably coupled thereto, and the fan rotates during operation of the motor to produce air flow over the motor housing to facilitate cooling the motor. However, at least some known fans direct an insufficient volume of airflow that produces a less than optimal motor cooling effect, especially at the opposite end of the motor from the fan.

BRIEF DESCRIPTION

In one embodiment, a motor assembly having a rotational axis is provided. The motor assembly includes a motor housing comprising a plurality of cooling openings extending therethrough and defining a chamber. The motor assembly also includes a stator fixedly coupled to the motor housing and positioned within the chamber. A rotor is coupled to at least one of the motor housing and the stator, wherein the rotor is configured to rotate about the axis and is positioned within the chamber. The motor assembly also includes a fan rotatably coupled to the motor. The fan includes a first inlet side on a first axial side of the fan and a second inlet side on a second, opposing, axial side of the fan. The fan is configured to draw cooling air in a first direction through the at least one cooling opening into the first inlet side, and the fan is also configured to draw cooling air in a second, opposite direction into the second inlet side.

In another embodiment, a fan for a motor assembly having a rotational axis and a housing having a plurality of cooling openings is provided. The fan includes a central hub, a plurality of circumferentially-spaced spokes extending from the central hub, and a plurality of circumferentially-spaced blades coupled to the plurality of spokes in a one-to-one relationship such that a radially inner edge of each blade is positioned radially outward from the central hub.

DETAILED DESCRIPTION

The methods and systems described herein facilitate providing a motor assembly for cooling a rotating device such as a motor. The motor assembly includes a rotational axis and a motor housing comprising a plurality of cooling openings extending therethrough and defining a chamber. The motor assembly also includes a stator fixedly coupled to the motor housing and positioned within the chamber. A rotor is coupled to at least one of the motor housing and the stator, wherein the rotor is configured to rotate about the axis and is positioned within the chamber. The motor assembly also includes a fan rotatably coupled to the motor. The fan includes a first inlet side on a first axial side of the fan and a second inlet side on a second, opposing, axial side of the fan. The fan is configured to draw cooling air in a first direction through the at least one cooling opening into the first inlet side, and the fan is also configured to draw cooling air in a second, opposite direction into the second inlet side.

During operation, the fan rotates to draw cooling air through the housing openings and the chamber to pass around or through the stator and the rotor for cooling. More specifically, a first end frame of the housing includes a first plurality of cooling openings and a second end frame of the housing includes a second plurality of cooling openings. These openings are in flow communication through the chamber to channel cooling air through the chamber to facilitate cooling the motor. Additionally, the fan draws cooling air from the side of the fan opposite the motor such that to fan draws cooling from two opposite directions simultaneously.

Figure 1:
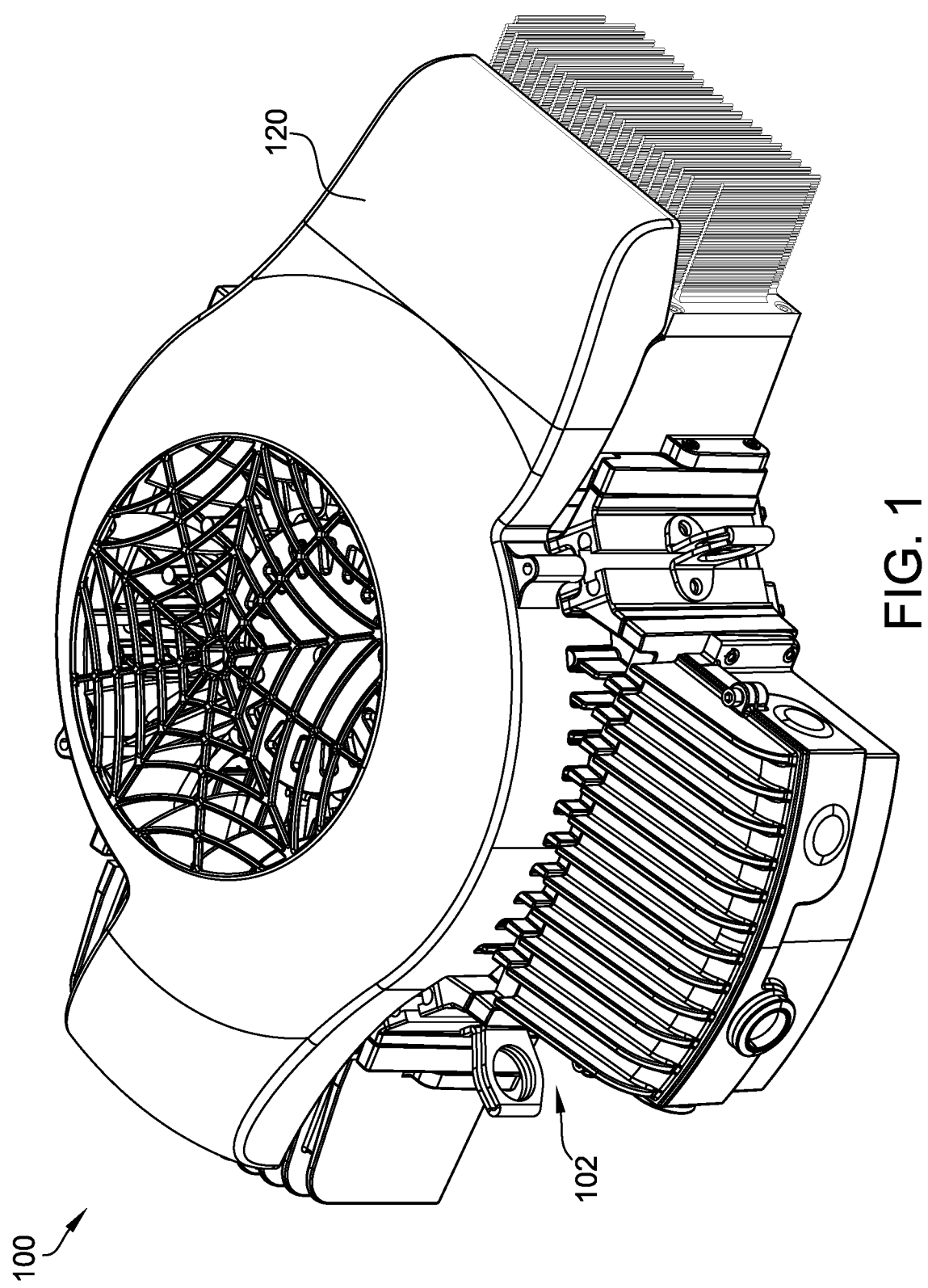
FIG. 1 is a perspective view of an exemplary electric motor assembly.
Figure 2:
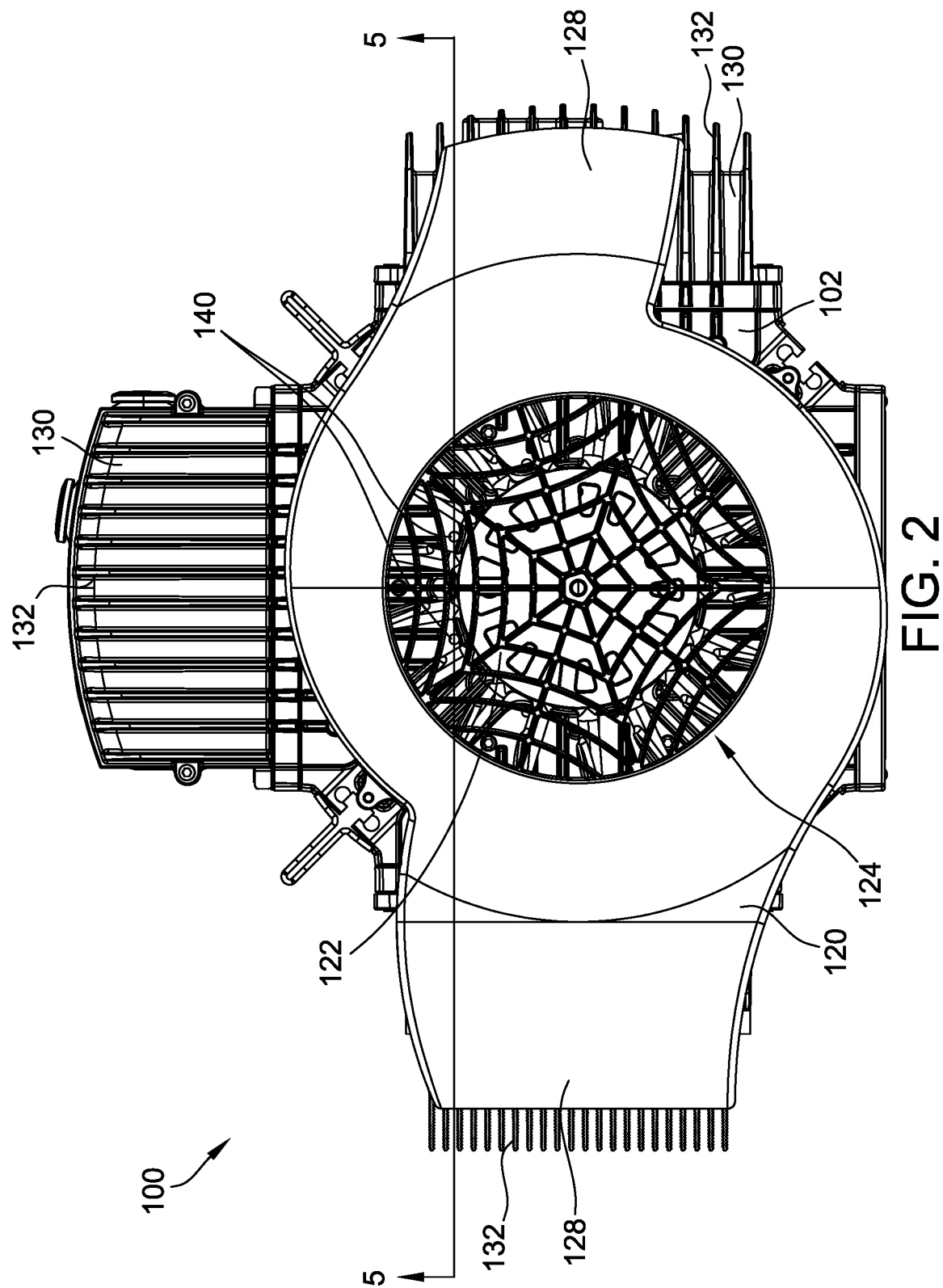
FIG. 2 is a top view of the motor assembly shown in FIG. 1.
Figure 3:
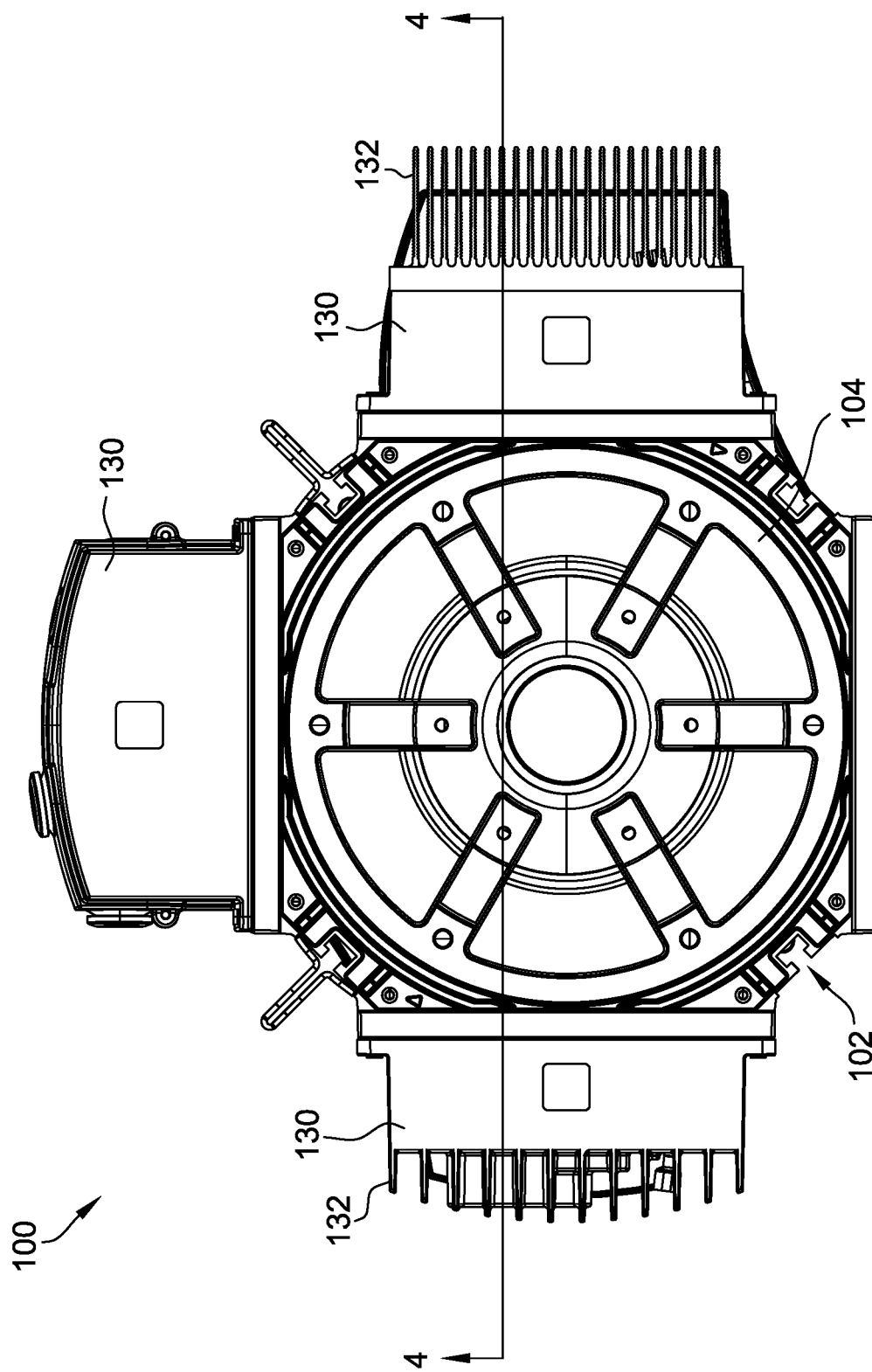
FIG. 3 is a bottom view of the motor assembly shown in FIG. 1.

FIG. 1 is a perspective view of an electric motor assembly 100, FIG. 2 is a top view of motor assembly 100, and FIG. 3 is a bottom view of motor assembly 100. Furthermore, FIG. 4 is a cross-sectional view of electric motor assembly 100 taken along line 4-4 in FIG. 3, and FIG. 5 is a cross-sectional view of electric motor assembly 100 taken along line 5-5 in FIG. 2.

In the exemplary embodiment, motor assembly 100 includes a motor housing 102 that includes a first end frame 104 and an opposing second end frame 106. End frames 104 and 106 define a chamber 108 of housing 102 that contains motor 110 therein. More specifically, motor 110 includes a stator 112 fixedly coupled to housing 102 and a rotor 114 rotatably coupled to at least one of housing 102 and stator 112. Stator 112 and rotor 114 are housed within chamber 108. Motor 110 also includes a shaft 116 extending through chamber 108 and around which rotor 114 is positioned. Shaft 116 extends along a rotational axis 118 of motor assembly 110 about which rotor 114 rotates during operation of motor 110.

In the exemplary embodiment, motor assembly 110 also includes a shroud 120 coupled to motor housing 102 and a fan 122 positioned between shroud 120 and second end frame 106. Shroud 120 includes a primary inlet 124 defined in shroud 120 opposite housing 102. Shroud 120 may also include a screen 126 extending across primary inlet 124 to restrict access to fan 122. In the exemplary embodiment, shroud 120 further includes at least one outlet 128 through which fan 122 channels cooling air. More specifically, housing 102 may include one or more modules 130 extending radially from end frames 104 and 106. Outlets 128 of shroud 120 are configured to channel cooling flow from within shroud 120 through or across a plurality of cooling fins 132 on modules 130 to facilitate cooling various electrical components housed within modules 130. Additionally, second end frame 106 also includes a plurality of cooling fins 134 extending away from chamber 108 that facilitate cooling motor 110.

Figure 4:
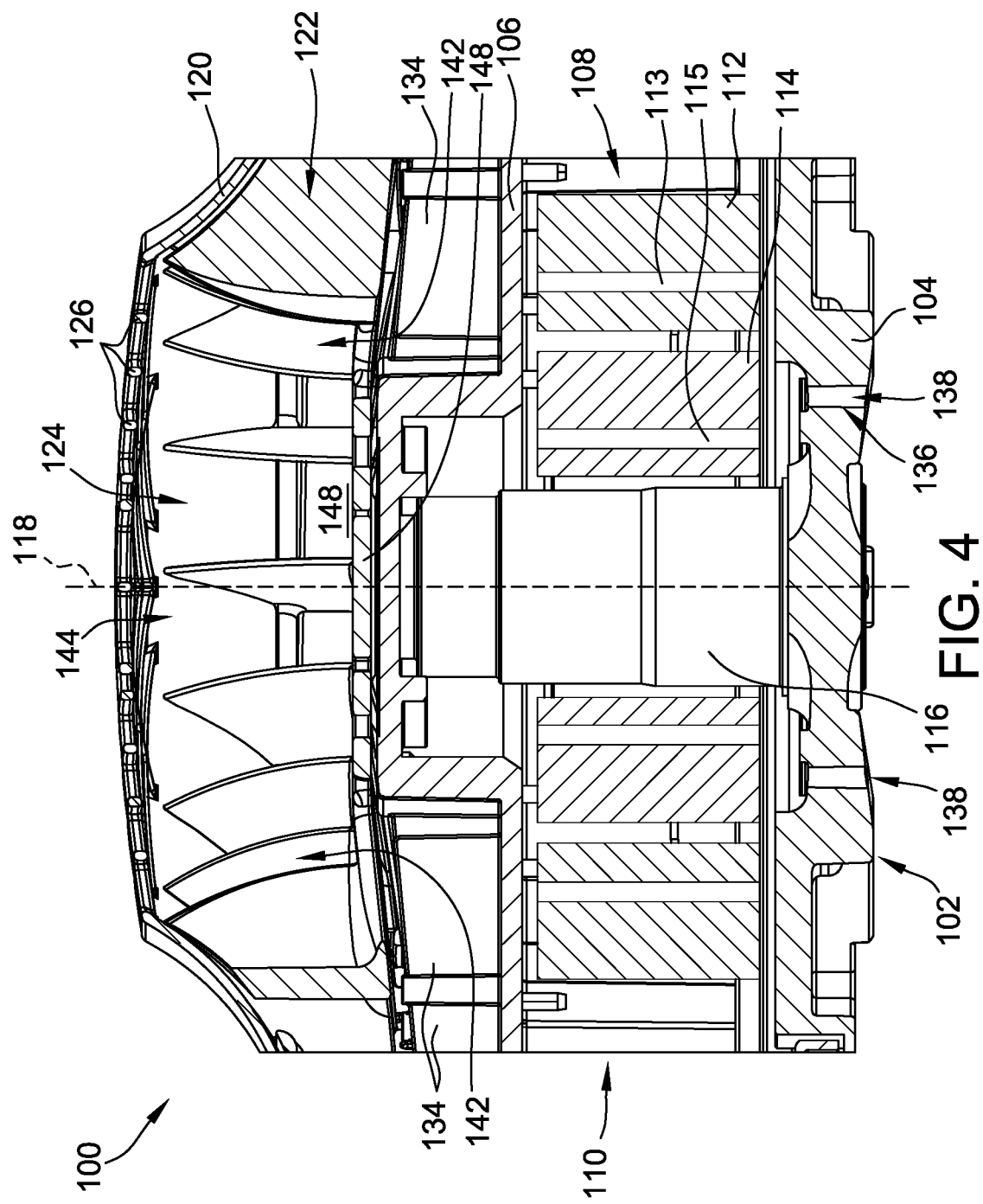
FIG. 4 is a cross-sectional view of the electric motor assembly shown in FIG. 1 taken along line 4-4 in FIG. 3.
Figure 5:
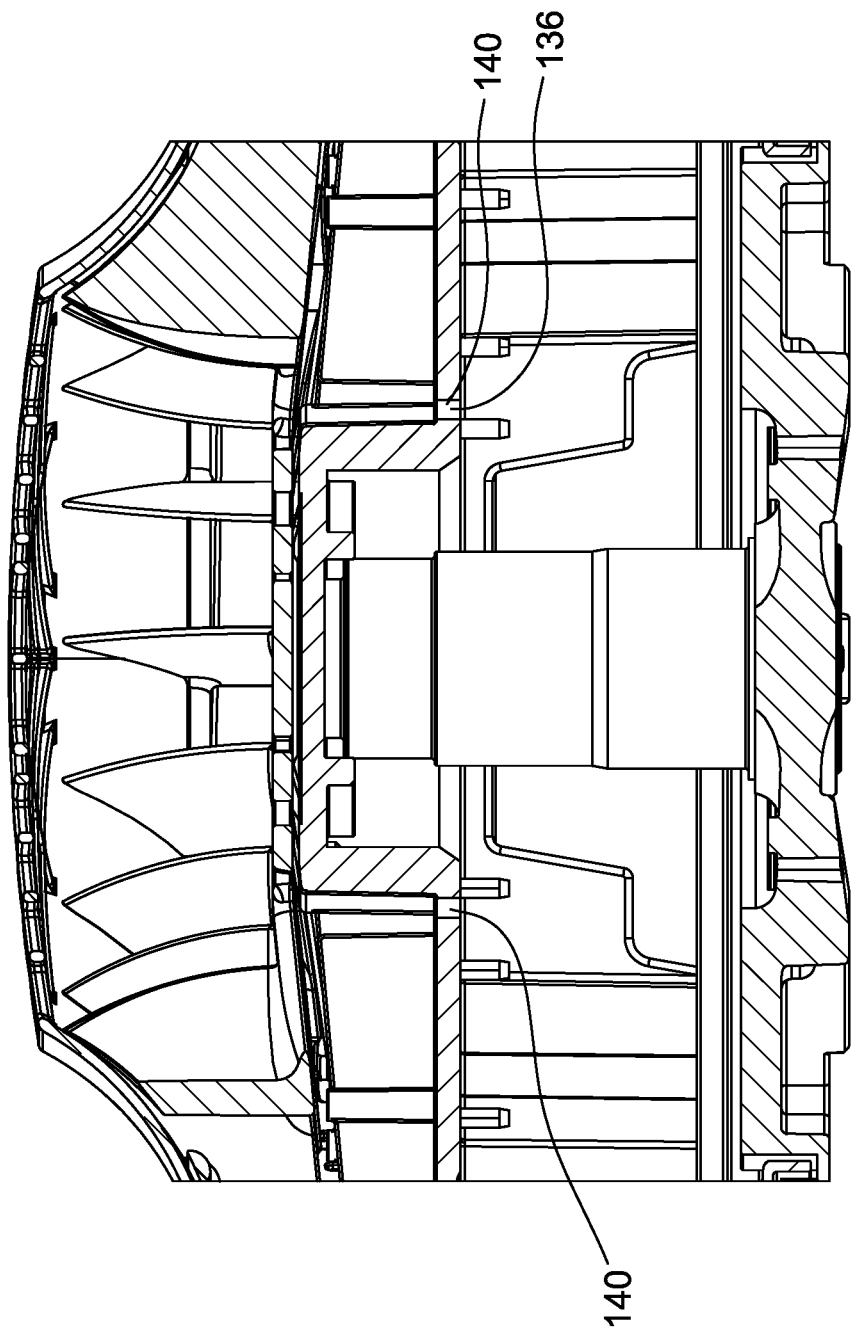
FIG. 5 is a cross-sectional view of the electric motor assembly shown in FIG. 1 taken along line 5-5 in FIG. 2.
Figure 6:
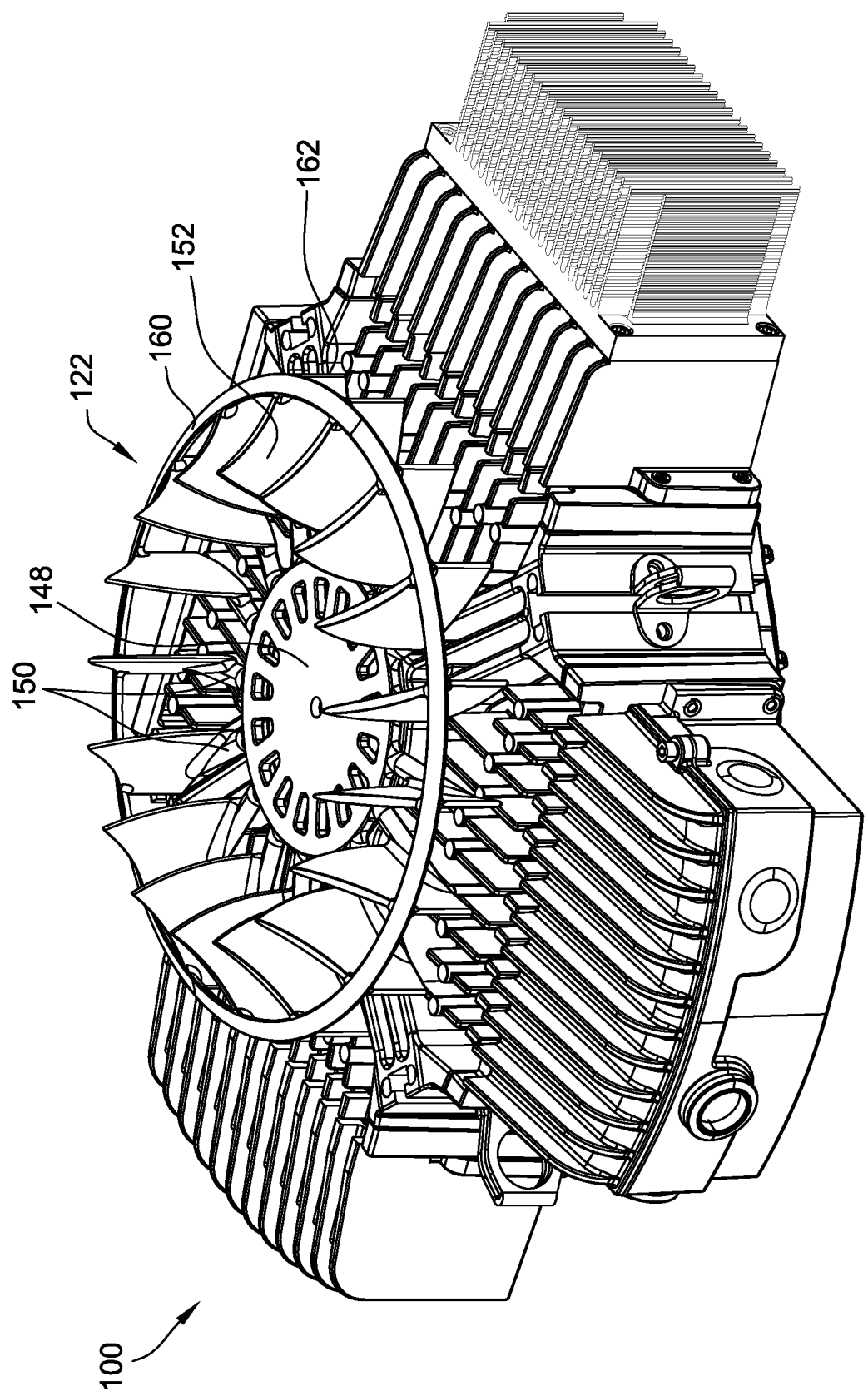
FIG. 6 is a perspective view of the electric motor assembly shown in FIG. 1 illustrating an exemplary fan with an exterior shroud removed.

As best shown in FIGS. 4 and 5, housing 102 includes a plurality of cooling openings 136 extending through housing 102 and configured to facilitate cooling motor 110. Specifically, during operation, fan 122 rotates to draw cooling air through openings 136 and chamber 108 to pass around or through stator 112 and rotor 114 for cooling. More specifically, first end frame 104 includes a first plurality of cooling openings 138 and second end frame 106 includes a second plurality of cooling openings 140. Openings 138 and 140 are in flow communication through chamber 108 to channel cooling air through chamber 108 to facilitate cooling motor 110. Alternatively, end frames 104 and 106 each include a single circumferential cooling opening defined at least partially around shaft 116.

In the exemplary embodiment, openings 138 and 140 are circumferentially-spaced about axis 118. Additionally, first plurality of openings 138 in first end frame 104 are positioned radially inward of second plurality of openings 140 in second end frame 106.

In the exemplary embodiment, fan 122 is operatively coupled to rotor 114 such that rotation of rotor 114 causes rotation of fan 122. In one embodiment, fan 122 is coupled to an exterior surface of second end frame 106 and positioned outside chamber 108. In another embodiment, fan 122 is positioned within chamber 108 and is on an inner surface side of second end frame 106. Furthermore, in the exemplary embodiment, fan 122 includes a first inlet side 142 adjacent second end frame 106 and a second inlet side 144 adjacent shroud 120. As such, inlets 142 and 144 are on opposing axial sides of fan 122.

In operation, rotation of fan 122 causes air to enter shroud 120 through shroud inlet 124 in a first direction, and then enter an interior 146 of fan 122 through fan second inlet side 144, which is axially aligned with shroud inlet 124. Furthermore, the low pressure within fan interior 146 causes cooling air to flow in a second direction opposite the first direction through openings 138 in end frame 104, into chamber 108, through openings 140 in end frame 106, passed cooling fins 134, and then through first inlet side 142 into interior 146. Fan 122 then discharges the cooling air through outlets 128 in shroud 120. As such, fan 122 draws cooling air from two opposite directions simultaneously to provide additional cooling to motor 110.

In one embodiment, rotor 114 includes a plurality of rotor openings 115 defined therethrough to enable cooling air to flow through rotor 114 in addition to around rotor 114 within chamber 108. Similarly, in one embodiment, stator 112 may also include a plurality of stator openings 113 enable cooling air to flow through stator 112 in addition to around stator 112 within chamber 108. In the exemplary embodiment, openings 113 and 115 are in flow communication with cooling openings 138 and 140 of first end frame 1-4 and second end frame 106, respectively, to allow air flow through stator 112 and/or rotor 114 and through inlet 142 of fan 122.

Although openings 113 and 115 are shown in FIGS. 4 and 5 are being formed on an interior of stator 112 and rotor 114, openings 113 and 115 may be formed at any radial location within stator 112 and rotor 114 that facilitates cooling and enables operation of motor assembly 100 as described herein. Furthermore, although motor 110 is illustrated as a radial flux motor, in some embodiments, motor 110 is an axial flux motor.

In the exemplary embodiment, fan 122 includes a central hub 148, a plurality of spokes 150 extending radially from hub 148, and a plurality of blades 152 coupled to the plurality of spokes 150 in a one-to-one relationship. Central hub 148 includes a plurality of openings 154 and terminates at the meeting of hub 148 and spokes 150. In the exemplary embodiment, fan 122 does not include a back plate such that fan 122 is free of material between adjacent spokes 150. More specifically, first inlet side 142 of fan 122 is defined between adjacent spokes 150. As such, cooling air is able to flow through openings 140 in second end frame 106 and between spokes 150 into interior 146 of fan 122.

Figure 7:
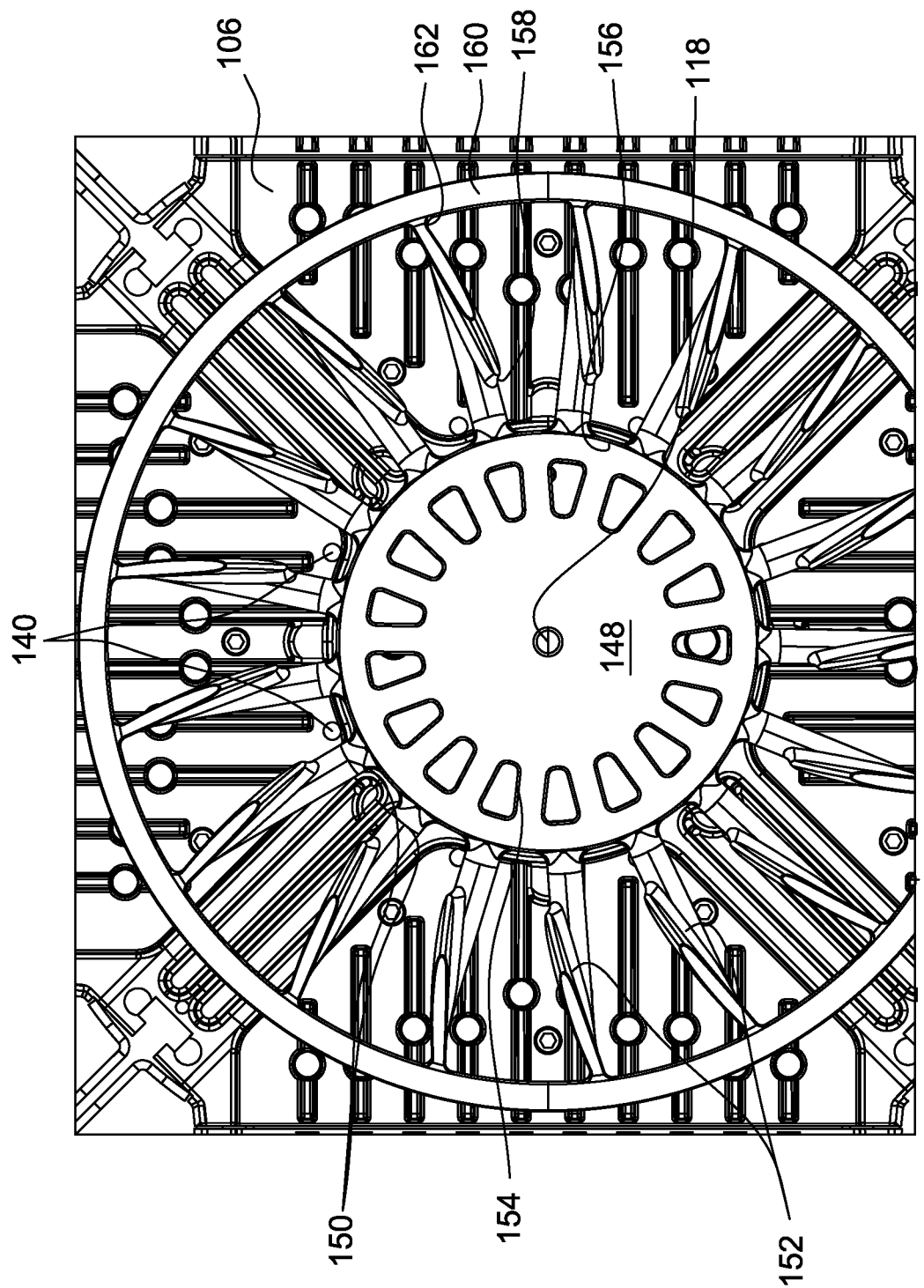
FIG. 7 is an enlarged top view of the fan and motor assembly.

As best shown in FIG. 7, second plurality of openings 140 in second end frame 106 are positioned radially inward of radially inner edge 158 of blades 152. Furthermore, second plurality of openings 140 in second end frame 106 are positioned radially outward of radially outer edge 156 of central hub 148. As such, second openings 140 are substantially radially aligned with spokes 150. Such a configuration allows for cooling air to flow through chamber 108 and into inlet 142 of fan 122. Additionally, openings 154 allow any cooling air that gets channeled below hub 148 to flow upward through hub 148 and into fan interior 146.

Fan 122 further includes a stiffening ring 160 coupled proximate a radially outer edge 162 of blades 152. Because fan 122 does not include a back plate that extends to blades 152, stiffening ring 160 secures blades 152 in place and prevents twisting.

The methods and systems described herein facilitate providing a motor assembly for cooling a rotating device such as a motor. The motor assembly includes a rotational axis and a motor housing comprising a plurality of cooling openings extending therethrough and defining a chamber. The motor assembly also includes a stator fixedly coupled to the motor housing and positioned within the chamber. A rotor is coupled to at least one of the motor housing and the stator, wherein the rotor is configured to rotate about the axis and is positioned within the chamber. The motor assembly also includes a fan rotatably coupled to the motor. The fan includes a first inlet side on a first axial side of the fan and a second inlet side on a second, opposing, axial side of the fan. The fan is configured to draw cooling air in a first direction through the at least one cooling opening into the first inlet side, and the fan is also configured to draw cooling air in a second, opposite direction into the second inlet side.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A motor assembly having a rotational axis, said motor assembly comprising:
   a motor housing defining a chamber and comprising at least one cooling opening extending through said motor housing and a shroud coupled to said motor housing;
   a stator fixedly coupled to said motor housing and positioned within said chamber;
   a rotor coupled to at least one of said motor housing and said stator, wherein said rotor is configured to rotate about said axis and is positioned within said chamber; and
   a fan rotatably coupled to said motor housing, wherein said fan comprises a first inlet side on a first axial side of said fan adjacent said motor housing and a second inlet side on a second, opposing, axial side of said fan, wherein said fan is configured to draw cooling air to enter said shroud in a first direction through said at least one cooling opening into said first inlet side, and wherein said fan is configured to draw cooling air to enter an interior of said fan in a second, opposite direction into said second inlet side, wherein said fan includes a central hub and a plurality of spokes extending radially from said central hub such that said fan is configured to be free of material between adjacent spokes.

2. The motor assembly as in claim 1, wherein operation of said fan is configured to draw cooling air into said first inlet side though said at least one cooling opening and through said second inlet side simultaneously.

3. The motor assembly as in claim 1, wherein said motor housing comprises a first end frame and an opposing second end frame, and wherein said at least one cooling opening comprises a first plurality of openings defined through said first end frame and a second plurality of openings defined through said second end frame.

4. The motor assembly as in claim 3, wherein said first and second pluralities of openings are circumferentially spaced about said axis.

5. The motor assembly as in claim 3, wherein said first plurality of openings are positioned radially inward of said second plurality of openings.

6. The motor assembly as in claim 3, wherein said rotor comprises a plurality of rotor cooling openings in flow communication with said at least one cooling opening of said motor housing.

7. The motor assembly as in claim 3, wherein said stator comprises a plurality of stator cooling openings in flow communication with said at least one cooling opening of said motor housing.

8. The motor assembly as in claim 1, wherein said fan further comprises:

a plurality of blades coupled to said plurality of spokes in a one-to-one relationship.

9. The motor assembly as in claim 8, wherein said fan does not include a back plate such that said fan is free of material between adjacent spokes.

10. The motor assembly as in claim 8, wherein said fan comprises a stiffening ring coupled proximate a radially outer edge of said plurality of blades.

11. The motor assembly as in claim 8, wherein said motor housing comprises a first end frame and an opposing second end frame, and wherein said at least one cooling opening comprises a first plurality of openings defined through said first end frame and a second plurality of openings defined through said second end frame.

12. The motor assembly as in claim 11, wherein said second plurality of openings are positioned radially inward of a radially inner edge of said plurality of blades.

13. The motor assembly as in claim 1, wherein said shroud is configured to surround said fan, wherein said shroud comprises a shroud inlet axially aligned with said second inlet side of said fan.

14. The motor assembly as in claim 13, wherein said motor housing comprises at least one extension module having a plurality of cooling fins coupled thereto, and wherein said shroud comprises at least one outlet configured to channel cooling air across said plurality of cooling fins.

15. The motor assembly as in claim 1, wherein said fan is coupled to an exterior of said motor housing, outside said chamber.

16. The motor assembly as in claim 1, wherein said fan is coupled within said chamber.

17. A fan for a motor assembly having a rotational axis and a motor housing having a plurality of cooling openings, said fan comprising:

a central hub having a radially outer edge;
a plurality of circumferentially-spaced spokes extending from said central hub; and
a plurality of circumferentially-spaced blades coupled to said plurality of spokes in a one-to-one relationship, wherein a radially inner edge of each blade is positioned radially outward from said central hub, and
wherein said plurality of blades extend axially from said plurality of spokes, and
wherein at least some of the plurality of cooling openings are positioned radially inward of the radially inner edge of the plurality of circumferentially-spaced blades, and positioned radially outward and circumferentially around the radially outer edge of the central hub.

18. The fan as in claim 17, wherein said central hub comprises a plurality of hub openings.

19. The fan as in claim 17, wherein said fan comprises a stiffening ring coupled proximate a radially outer edge of said plurality of blades, and wherein said fan does not include a back plate such that said fan is free of material between adjacent spokes.

20. The fan as in claim 17, wherein a radially inner edge of each blade is positioned radially outward from a portion of the plurality of cooling openings in the motor housing.

* * * * *